United States Patent
Chong et al.

(10) Patent No.: US 11,735,965 B2
(45) Date of Patent: Aug. 22, 2023

(54) ROTOR ASSEMBLY

(71) Applicants: Rolls-Royce plc, London (GB); Rolls-Royce Singapore Pte. Ltd., Singapore (SG)

(72) Inventors: Ellis Fui Hen Chong, Derby (GB); Shanmukha Rama Krishna, Sengkang (SG); Mark Boden, Derbyshire (GB)

(73) Assignees: Rolls-Royce plc, London (GB); Rolls-Royce Singapore Pte. Ltd., Singapore (SG)

( * ) Notice: Subject to any disclaimer, the term of this patent is extended or adjusted under 35 U.S.C. 154(b) by 214 days.

(21) Appl. No.: 17/208,482

(22) Filed: Mar. 22, 2021

(65) Prior Publication Data

US 2022/0302779 A1  Sep. 22, 2022

(51) Int. Cl.
| H02K 1/27 | (2022.01) |
| H02K 1/28 | (2006.01) |
| H02K 15/03 | (2006.01) |
| H02K 1/278 | (2022.01) |
| H02K 1/02 | (2006.01) |
| H02K 1/04 | (2006.01) |

(52) U.S. Cl.
CPC ............... *H02K 1/278* (2013.01); *H02K 1/02* (2013.01); *H02K 1/04* (2013.01); *H02K 1/28* (2013.01); *H02K 15/03* (2013.01)

(58) Field of Classification Search
CPC ........... H02K 1/278; H02K 1/02; H02K 1/04; H02K 1/28; H02K 15/03
See application file for complete search history.

(56) References Cited

U.S. PATENT DOCUMENTS

| 2,949,555 | A | 8/1960 | Paul |
| 5,801,470 | A | 9/1998 | Johnson et al. |
| 7,675,213 | B2 | 3/2010 | Tenhunen |
| 7,902,700 | B1 | 3/2011 | Gabrys |
| 8,247,938 | B2 | 8/2012 | Saban et al. |
| 10,122,229 | B2 | 11/2018 | Arai |
| 2008/0238234 | A1 | 10/2008 | Saban et al. |
| 2010/0019602 | A1 | 1/2010 | Saban et al. |
| 2015/0188369 | A1* | 7/2015 | Arimatsu ............... H02K 1/28 310/156.28 |
| 2018/0316247 | A1* | 11/2018 | Andonian ............. H02K 15/03 |

FOREIGN PATENT DOCUMENTS

| DE | 102012205361 A1 | 10/2013 |
| EP | 1976096 A2 | 10/2008 |
| EP | 3468005 A1 | 4/2019 |

OTHER PUBLICATIONS

U.S. Appl. No. 17/208,444, filed Mar. 22, 2021, by Rama Krishna et al.

* cited by examiner

*Primary Examiner* — Thomas Truong
(74) *Attorney, Agent, or Firm* — Shumaker & Sieffert, P.A.

(57) ABSTRACT

A rotor assembly includes a plurality of segmented magnets on an outer surface of a rotor core, a metallic layer on the outer surface of the plurality of segmented magnets, and a plurality of segmented metallic bands on the outer surface of the metallic layer. The plurality of segmented metallic bands is configured to secure the plurality of segmented magnets to the outer surface of the rotor core, and each band of the plurality of metallic bands has an axial length less than an axial length of the rotor.

16 Claims, 6 Drawing Sheets

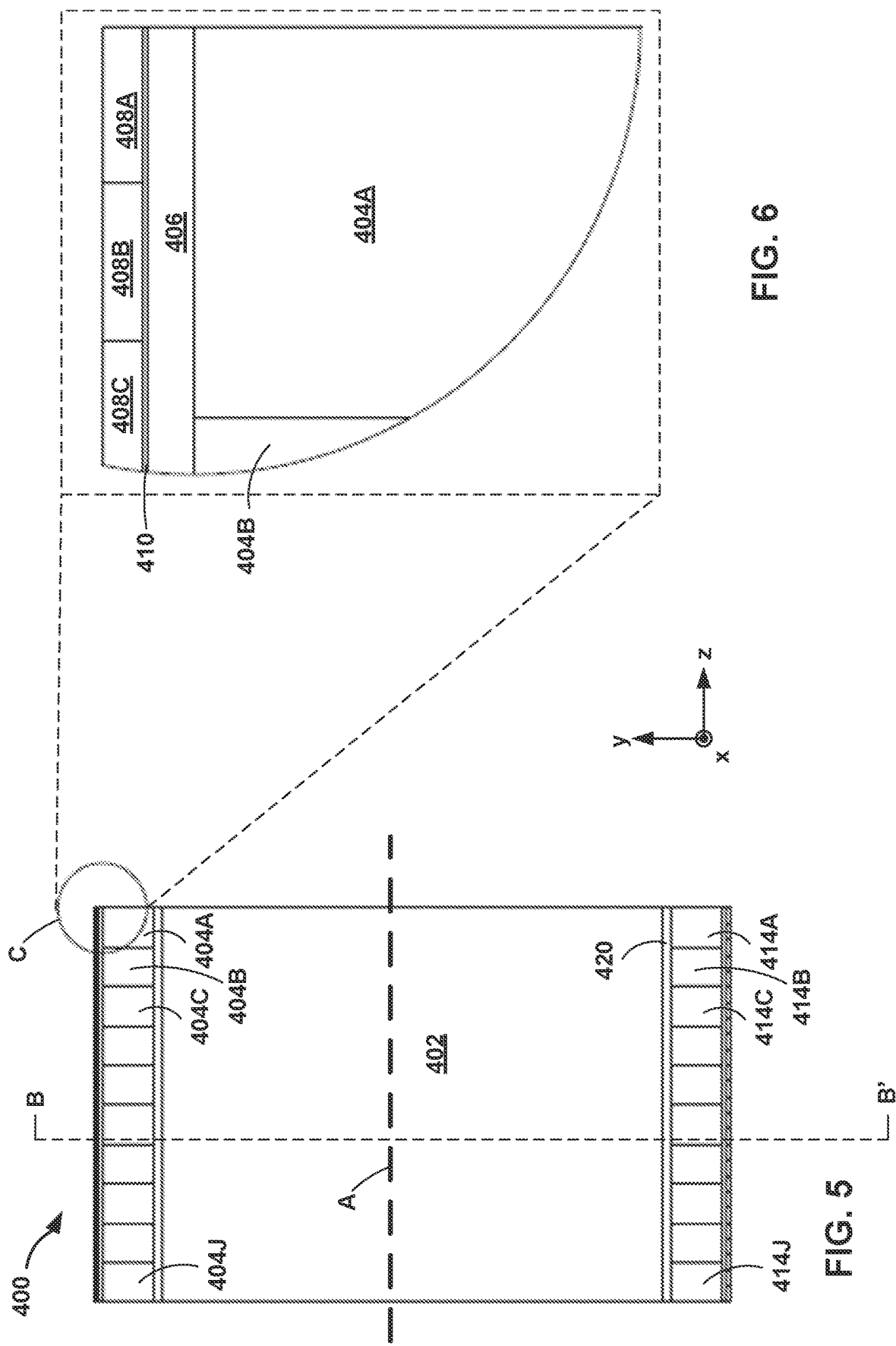

ROTOR ASSEMBLY

TECHNICAL FIELD

This disclosure relates to electric machines.

BACKGROUND

Electric machines covert electrical energy to mechanical energy or vice versa. As one example, an electric machine may operate as a generator that converts mechanical energy into electrical energy. As another example, an electric machine may operate as an electrical motor that converts electrical energy into mechanical energy. Electric machines typically include a rotor that rotates within a stator. Energy flows through the stator to or from the rotor. In an electric motor, the stator provides a rotating magnetic field that drives the rotor. In a generator, the stator converts the rotating magnetic field to electric energy.

SUMMARY

In one examples, this disclosure describes a rotor assembly including a plurality of segmented magnets on an outer surface of a rotor core; a metallic layer on the outer surface of the plurality of segmented magnets; and a plurality of segmented metallic bands on the outer surface of the metallic layer and configured to secure the plurality of segmented magnets to the outer surface of the rotor core, wherein each band of the plurality of metallic bands has an axial length less than an axial length of the rotor.

In another example, this disclosure describes a method of securing a plurality of segmented magnets to a rotor core, the method including disposing a plurality of segmented magnets on the outer surface of the rotor core; disposing a metallic layer on the outer surface of the plurality of segmented permanent magnets; and disposing a plurality of segmented metallic bands on the surface of the metallic layer, wherein the plurality of segmented metallic bands are configured to secure the plurality of segmented magnets to the outer surface of the rotor core, and wherein each band of the plurality of metallic bands has an axial length less than an axial length of the rotor.

In another examples, this disclosure describes an electric machine including a rotor assembly, the rotor assembly including a plurality of segmented magnets disposed on the outer surface of a rotor core; a metallic layer disposed on the outer surface of the plurality of segmented magnets; and a plurality of segmented metallic bands disposed on the outer surface of the first metallic layer and configured to secure the plurality of segmented magnets to the outer surface of the rotor core, and wherein each band of the plurality of metallic bands has an axial length less than an axial length of the rotor.

The details of one or more examples are set forth in the accompanying drawings and the description below. Other features, objects, and advantages will be apparent from the description and drawings, and from the claims.

BRIEF DESCRIPTION OF DRAWINGS

FIG. 5 is a cross-sectional diagram of a rotor assembly, in accordance with one or more techniques of this disclosure.

FIG. 6 is cross-sectional diagram of a portion of the rotor assembly of FIG. 5, in accordance with one or more techniques of this disclosure.

DETAILED DESCRIPTION

Figure 1:
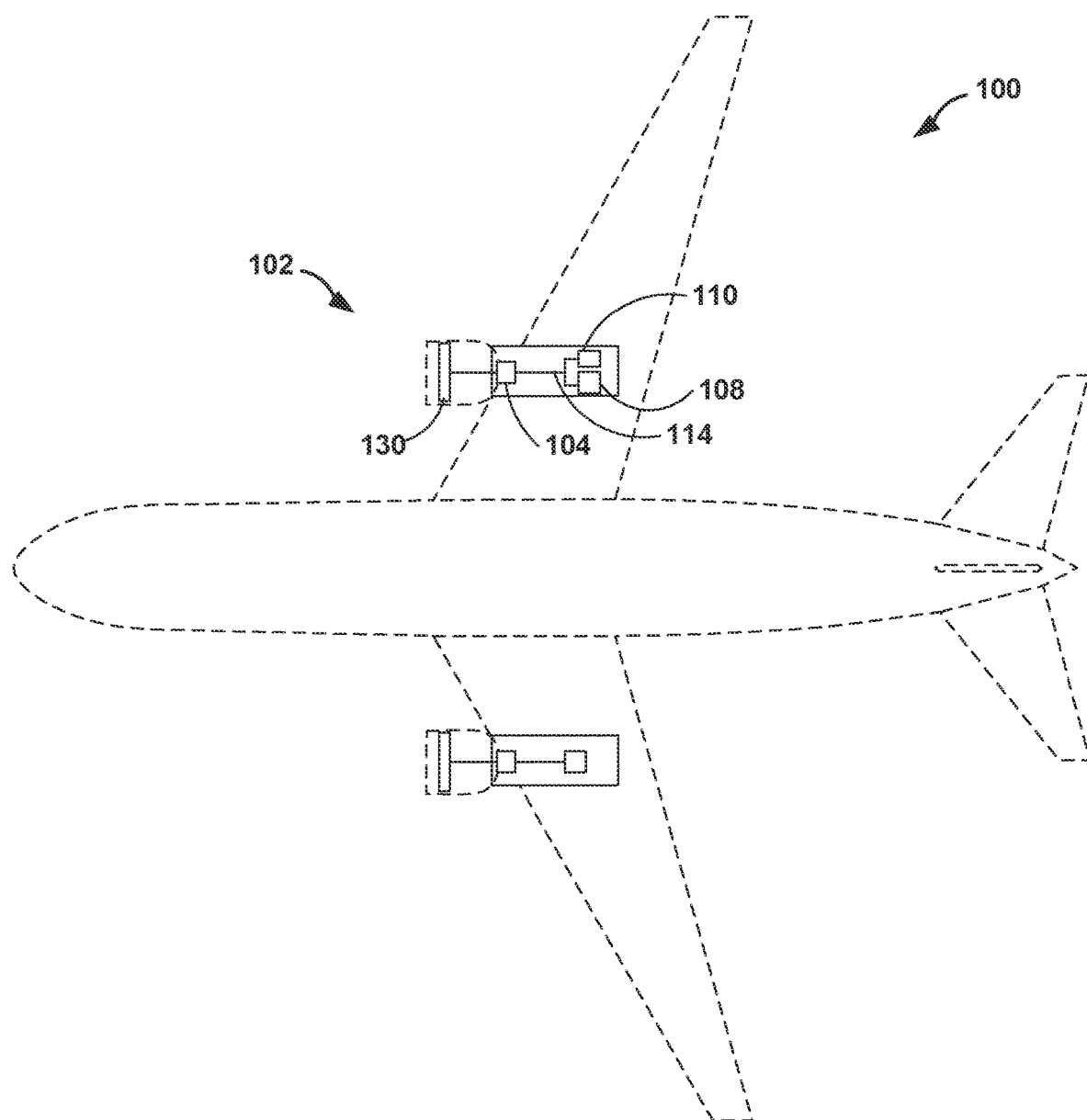
FIG. 1 is a conceptual diagram of a vehicle that includes an electric machine, in accordance with one or more techniques of this disclosure.

Electric machines may be used to provide energy to, or extract energy from, rotating devices. As one example, an electrical generator may convert rotational mechanical energy extracted from a combustion motor into electrical energy. As another example, an electrical motor may provide rotational mechanical energy to assist with starting a combustion motor. As another example, an electrical motor may provide rotational mechanical energy to drive a propulsor (e.g., fan, propeller, etc.) of a vehicle. An electric machine may operate in various modes at different times. For instance, a particular electric machine may operate as a starter to start a combustion motor at a first time and operate as a generator to convert rotational mechanical energy generated by the combustion motor into electrical energy at a second time. In this way, an electric machine may operate as an electrical starter-generator.

An electric machine may include a rotor that rotates relative to a stator. The rotor may include magnets, e.g., permanent magnets (PMs), disposed around a cylindrical body of the rotor. Magnetic fields of the magnets of the rotor interact with magnetic fields generated by windings included in the stator to transfer energy. The rotor may include metallic banding, e.g., one or more metallic bands and/or rings, configured to secure the magnets to the rotor against centrifugal forces, e.g., when the rotor is in operation and is rotating. The stator may transfer energy to, or receive energy from, the rotor via interaction between magnetic fields generated by the stator windings and magnetic fields generated by the rotor. For example, an alternating current may be applied to the stator windings in a motor which may cause alternating magnetic fields. Interaction between magnetic fields generated by the magnets of the rotor and the alternating magnetic fields may transfer and convert the electrical energy in the stator windings to mechanical motion (e.g., rotation) of the rotor. Similarly, rotation of the rotor in a generator may cause alternating magnetic fields which may transfer and convert the mechanical energy of the motion of the rotor to electrical energy in the stator windings via induction of a current in the windings by the alternating magnetic fields. However, the alternating magnetic fields in an electric machine (e.g., motor or generator) may also induce eddy currents in conductors that are within the magnetic fields, such as the magnets and the metallic banding of the rotor. Such eddy currents are energy losses between the rotor and stator because at least some of the energy to be transferred between the rotor and the stator is coupled into the induced eddy currents, at least a portion of which is ultimately converted to heat via resistance in the material (e.g., the metallic banding and/or magnets).

In accordance with one or more techniques of this disclosure, the metallic banding and magnets may be segmented to reduce losses caused by eddy currents. For example, the permanent magnets may be segmented in the axial direction, and the metallic banding may be segmented in the axial direction into "bands" and/or "rings." The segmenting of the magnets and the metallic banding may limit the amount of energy that can be coupled into the eddy currents. For example, eddy currents flow in closed loops perpendicular to the plane of the magnetic field, and the reduction in axial length of the magnets and/or metallic banding via segmenting compresses the size of the potential eddy current loop and the amount of energy that can be coupled into the current loop.

Segmenting the magnets and the metallic banding may cause additional challenges to the assembly of the rotor. For example, segmented metallic bands may be press-fit onto a rotor and over (e.g., circumferentially surrounding) segmented magnets. The metallic bands may flex over the uneven surface of the segmented magnets when being press-fit into place and may compress into grooves between magnet segments. This may cause difficulty in press-fitting the segmented metallic bands into place (e.g., more force required to move the rings) and damage to the segmented magnets and the segmented metallic bands (e.g., damage such as chipping, scraping, scratching, bending, etc., of surfaces and edges of the magnets and the segmented metallic bands). In some examples, when in position and press-fit into place, at least a portion of some of the segmented metallic bands may align with grooves of the segmented magnets and may at least partially compress into the grooves forming an uneven fit over the segmented magnets. Such an uneven fit may reduce the integrity of the metallic banding and cause further damage to the segmented magnets and/or segmented metallic bands during operation of the high-speed rotor.

The present disclosure also describes a rotor that includes a multi-layered metallic banding system. For example, the rotor may include a metallic layer disposed on the outer surface of a plurality of segmented magnets that are disposed on the outer surface of the rotor and/or rotor core, and a plurality of segmented metallic bands that may be press-fit over the outer surface of the metallic layer. In some examples, the metallic layer may have a radial thickness that is less than an electrical skin depth of a dominant magnetic field frequency in the air gap between the rotor and a stator and may be slip-fit and heat-shrunk on the plurality of segmented magnets. The plurality of segmented metallic bands may be configured to hold the plurality of segmented magnets to the outer surface of the rotor, e.g., each of the segmented metallic bands may be thick enough to mechanically withstand the centrifugal forces on the segmented magnets to secure the segmented magnets to the rotor during operation of the high-speed rotor. In some examples, each band/ring/segment of the plurality of segmented metallic bands has an axial length less than the axial length of the rotor.

In some examples, the metallic layer may provide benefits including decoupling the mechanical constraints due to press-fitting the segmented metallic bands about the segmented magnets, e.g., the metallic layer may serve to protect the magnets and the metallic banding during press fitting as well as when the segmented metallic bands are each in place. Decoupling the mechanical constraints due to press-fitting simplifies the assembly of the metallic banding arrangement, e.g., for permanent magnet synchronous motors and generators, and reduces manufacturing cost. Decoupling the mechanical constraints by introducing the metallic layer between the plurality of segmented magnets and the plurality of segmented metallic bands also provides protection to both the magnets and bands from damage during press fitting and during operation of the high-speed rotor.

In some examples, the metallic layer may be thin enough to reduce eddy currents within the metallic layer itself (e.g., by being less than the skin depth of the dominant frequency of the magnetic field). The metallic layer may be slip-fit over the plurality of segmented magnets and may be heat-shrinkable onto the plurality of segmented magnets, e.g., the metallic layer may be thin enough and made of a heat-shrinkable material. For example, the metallic layer may be a thin (e.g., less than 1 millimeter in radial thickness) Inconel, titanium, stainless steel, and the like. The metallic layer, once in place and covering the segmented magnets, may be held to the segmented magnets by compression during heat shrinking, and may cover over any gaps and grooves of the segmented magnets, thereby reducing the radial depth variation of the outer surface of the segmented magnets. The resulting smoothed surface provided by the metallic layer may reduce friction and resistance of the segmented metallic bands during press-fitting and may protect both the segmented magnets and segmented metallic bands from chipping and/or other surface damage, e.g., by providing a barrier layer between the segmented magnets and the segmented metallic bands.

In some examples, a layer of an electrically insulating material may be disposed between the first metallic layer and the segmented metal bands as a sacrificial layer to further reduce press-fit friction and resistance of the segmented metallic bands and may be configured to increase heat transfer from inner layers (e.g., the rotor core, segmented magnets, and the first metallic layer) to the outer segmented metallic bands, e.g., for heat removal via a cooling fluid such as air and/or cooling oils or other suitable liquids.

FIG. 1 is a conceptual diagram of a vehicle 100 that includes an electric machine, in accordance with one or more techniques of this disclosure. In some examples, vehicle 100 is an aircraft. In other examples, vehicle 100 may include any type of vehicle utilizing an electric machine, including one or more types of air vehicles; land vehicles, including but not limited to, tracked and/or wheeled vehicles; marine vehicles, including but not limited to surface vessels, submarines, and/or semi-submersibles; amphibious vehicles; or any combination of one or more types of air, land, and marine vehicles. Vehicle 100 may be manned, semiautonomous, or autonomous.

As shown in the example of FIG. 1, vehicle 100 may include propulsion system 102. In some examples, propulsion system 102 may include a combustion engine, such as a gas-turbine engine. Propulsion system 102 includes motor 104 that is configured to drive propulsor 130. Propulsion systems that include gas-turbine engines may include electric generator 108 that may both start the gas-turbine engines and generate electrical power using mechanical energy generated by the gas-turbine engines. As shown in FIG. 1, propulsion system 102 may include generator 108 and energy storage system (ESS) 110 coupled to electrical bus 114, and motor 104 coupled to electrical bus 114.

In accordance with one or more techniques of this disclosure, motor 104 and/or generator 108 may include a permanent magnet rotor assembly including a multi-layered metallic banding system. In some examples, the multi-layered metallic banding system may include a relatively thin metallic layer (e.g., having a radial thickness that is less than one millimeter and/or less than the electrical skin depth of a dominant magnetic field frequency in the air gap between the rotor and the stator) that may be slip-fit or otherwise disposed over segmented magnets on the rotor, and which may be heat-shrunk to the segmented magnets. The multi-layer metallic banding system may further include a plurality of segmented metallic bands (alternatively referred to as rings and/or segments) configured to be press fit over the first metallic layer.

In some examples, the metallic layer may be configured to protect and reduce damage that may occur to both the segmented magnets and the segmented metallic bands during press-fitting of the segmented metallic bands over the uneven surfaces of the segmented magnets. In some examples, the metallic layer may be thin so as to reduce eddy currents in the first metallic layer and so as to be easily placed over the segmented magnets and heat shrunk to secure the metallic layer over the segmented magnets. The metallic layer may "smooth" the outer surface profile defined by the segmented magnets, e.g., by reducing the radial depth variation of the outer surface and may be a barrier to mechanical contact between the plurality of segmented magnets and the plurality of segmented metallic bands.

In some examples, the multi-layer metallic banding system may include an electrically insulating material disposed between the metallic layer and the segmented metal banding as a sacrificial layer. In some examples, the electrically insulating material may be made of fiberglass, a polymer, a polymer composite, and/or a polyimide film such as a Kapton™ sleeve. In some examples, the electrically insulating material may be made of an aramid or meta-aramid material, such as a Nomex™ sleeve. The electrically insulating material may be configured to further reduce press-fit friction and/or mechanical resistance of the segmented metallic bands, further smooth the outer surface profile defined by the segmented magnets, and may be configured to increase heat transfer from inner layers (e.g., the rotor core, segmented magnets, and the metallic layer) to the outer segmented metallic bands, e.g., for heat removal via a cooling fluid such as air and/or cooling oils or other suitable liquids.

Figure 2:
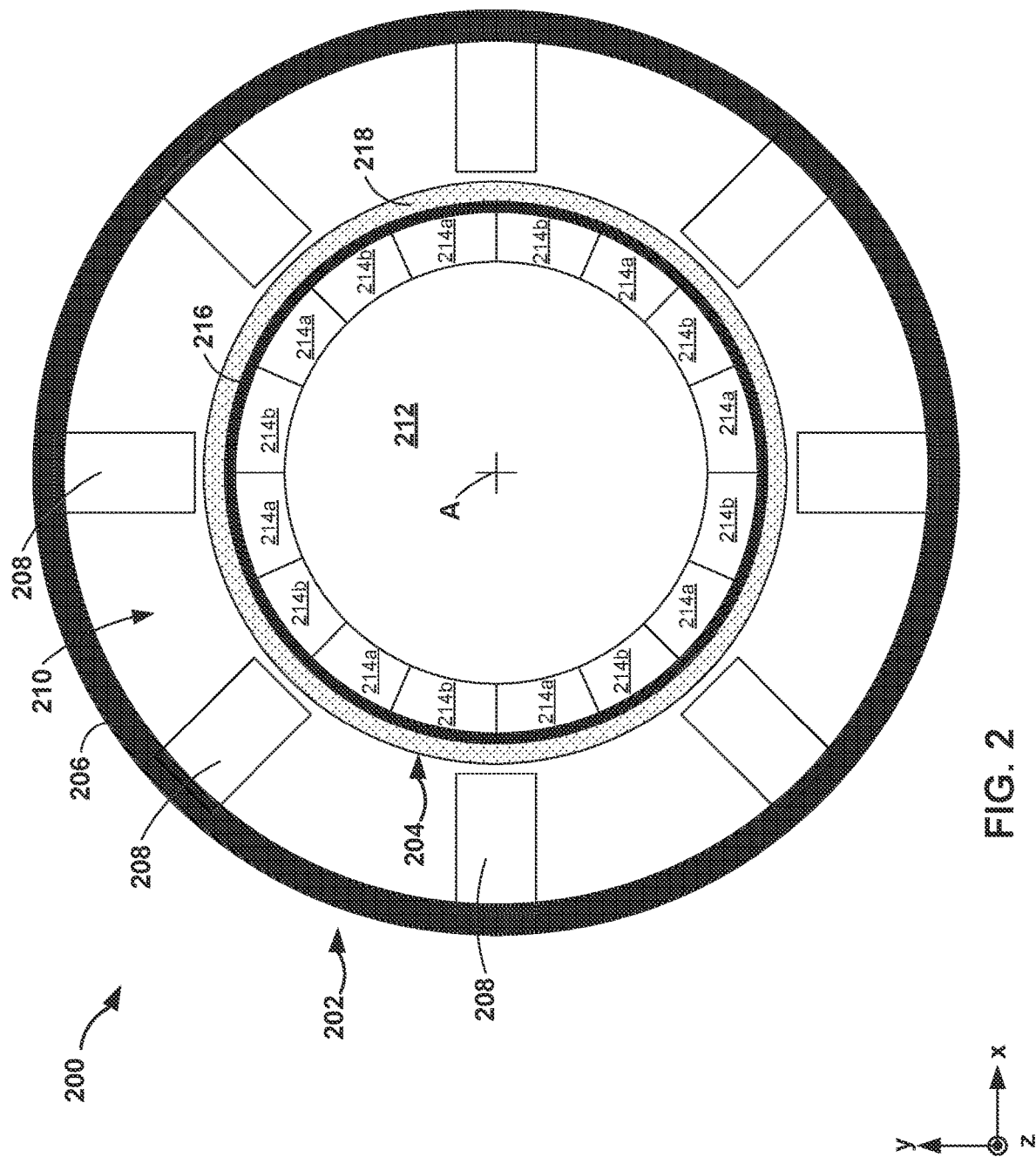
FIG. 2 is a cross-sectional diagram of an electric machine, in accordance with one or more techniques of this disclosure.

FIG. 2 is a perspective view of an electric machine 200, in accordance with one or more techniques of this disclosure. In the example shown, electric machine 200 includes stator 202 and rotor assembly 204. In some examples, electric machine 200 may be either, or both, of an electric generator configured to convert mechanical energy to electrical energy or an electric motor configured to convert electrical energy to mechanical energy.

In the examples shown, stator 202 includes base portion 206 and a plurality of stator teeth 208. Stator teeth 208 may project radially inward towards longitudinal axis A of rotor assembly 204 from base portion 206. In some examples, the plurality of stator teeth 208 may be disposed circumferentially around longitudinal axis A, e.g., about the z-axis as illustrated. In some examples, stator 202 may have a length that is substantially the entire length of electric machine 200 and/or rotor assembly 204, e.g., along longitudinal axis A in the z-direction. In other examples, electric machine 200 may include a plurality of stators 202 disposed along a longitudinal axis A in the z-direction, each stator 202 having a length that is less than the length of electric machine 200 and/or rotor assembly 204. In some examples, stator teeth 208 may define a plurality of slots 210 between stator teeth 208. A plurality of stator windings (not shown) may be wound around the plurality of stator teeth 208 and at least partially filling stator slots 210.

In the example shown in FIG. 2, rotor assembly 204 includes a rotor core 212, a plurality of magnet pairs 214a and 214b of opposite polarity (collectively referred to as magnets 214) on or about the surface of rotor core 212, a metallic layer 216, and metallic banding 218. As used herein, magnets of the "same polarity" have their magnetic poles oriented in the same direction, and magnets of the "opposite polarity" have their magnetic poles oriented in opposite directions. Namely, magnets do not have a particular polarity, but rather an orientation of their magnetic poles. For ease of description, magnets described as having the "same polarity" or "opposite polarity" relative to each other as used herein means that the magnets are oriented with like poles (e.g., their magnetic north and south poles) oriented in the same direction or opposite direction, respectively, relative to each other. For example, the magnetic north and south poles of magnets 214a and 214b may be oriented opposite to each other such that the north magnetic pole of magnet 214a may be at the end of magnet 214a in the positive z-direction and its south magnetic pole may be at its end in the negative z-direction, and the opposite may be true for magnet 214b.

In some examples, rotor core 212 may optionally have a coating and/or layer (not shown in FIG. 2) disposed on its outer surface, and magnets 214 may be disposed on the outer surface of such a coating and/or layer. Metallic banding 218 may be configured to secure magnets 214 to the outer surface of rotor core 212 or the outer surface of a coating and/or layer on the outer surface of rotor core 212. In some examples rotor core 212 may be a hollow shell and/or drum, and in other examples rotor core 212 may be a solid core. In some examples, rotor core 212 may be and/or include a drive shaft, or rotor core 212 may be mechanically coupled to a drive shaft in other examples.

When electric machine 200 is operating as a generator, a torque may be applied to rotor assembly 204, e.g., via rotor core 212 as a drive shaft. The rotation of rotor assembly 204 may cause an alternating magnetic field at each of stator teeth 208 due to the rotation of the magnet pairs 214a and 214b. The alternating magnetic fields may induce a current, e.g., and alternating current (AC) to flow in the windings of stator 202, thereby converting the mechanical energy (rotation) of the rotor into electrical energy in the windings. When electric machine 200 is operating as a motor, the opposite conversion may occur. Namely, AC flowing through the windings of stator 202 may cause alternating magnetic fields, which interact with magnets 214 to induce a torque on rotor assembly 204 thereby converting the electrical energy in the windings to mechanical energy of the rotor assembly.

In some examples, the alternating magnetic fields may induce eddy currents in electrical conductors located within the fields, e.g., magnets 214, metallic banding 218, etc. To reduce eddy currents, magnets 214 (e.g., each of the magnets 214a and 214b about the circumference of rotor core 212) and metallic banding 218 may be segmented in the axial direction into a plurality of segmented magnets 214 and a plurality of segmented metallic bands 218, e.g., along longitudinal axis A in the z-direction (not visible in the cross-section of FIG. 2 but illustrated in FIGS. 3-6).

In some examples, metallic layer 216 may be a thin, heat-shrinkable metal or alloy that may be slip-fit over the segmented magnets 214 and heat shrunk, e.g., for ease of assembly. In some examples, metallic layer 216 may be thin so as to reduce eddy currents in metallic layer 216. For example, metallic layer 216 may be have a radial thickness that is less than the electrical skin depth of a dominant magnetic field frequency in the air gap between the rotor assembly 204 and stator 202, e.g., less than one millimeter. In some examples, metallic layer 216 may be made of titanium, stainless steel, a metal alloy or superalloy such as a nickel-chromium or austenitic nickel-chromium based alloy (e.g., Inconel), or any other suitable metal.

In some examples, metallic layer 216 may be configured to protect and reduce damage and/or mechanical wear that may occur to both segmented magnets 214 and metallic banding 218 during press-fitting of the plurality of segmented metallic bands 218 over the uneven surfaces of segmented magnets 214 as well as during operation of electric machine 200. In some examples, metallic layer 216 may be thin so as to be easily slip-fit or otherwise placed over segmented magnets 214 and to be heat shrunk to secure metallic layer 216 over segmented magnets 214. The metallic layer may "smooth" the outer surface profile defined by segmented magnets 214, e.g., the outer surface of the metallic layer may have a reduced radial depth variation compared to the outer surface of the plurality of magnets, and the metallic layer may be a barrier to mechanical contact between segmented magnets 214 and plurality of segmented metallic bands 218. In some examples, metallic banding 218 may also reduce friction and/or resistance of the plurality of segmented metallic bands 218 during press-fitting and may protect both the segmented magnets and segmented metallic bands from chipping and/or other surface damage, e.g., by providing a barrier layer between the segmented magnets 214 and the plurality of segmented metallic bands 218.

Figure 3:
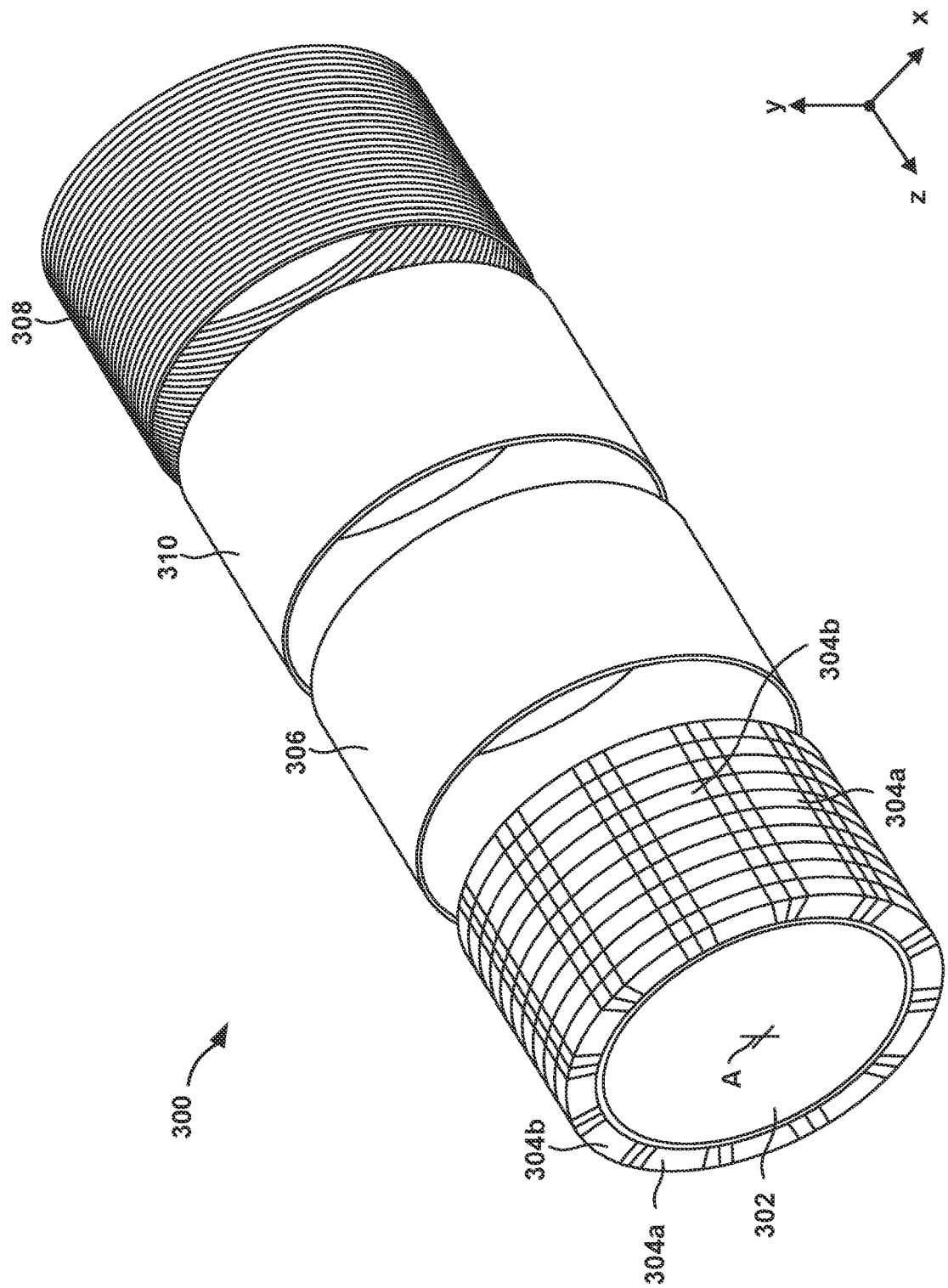
FIG. 3 is an exploded perspective view of a rotor assembly, in accordance with one or more techniques of this disclosure.
Figure 4:
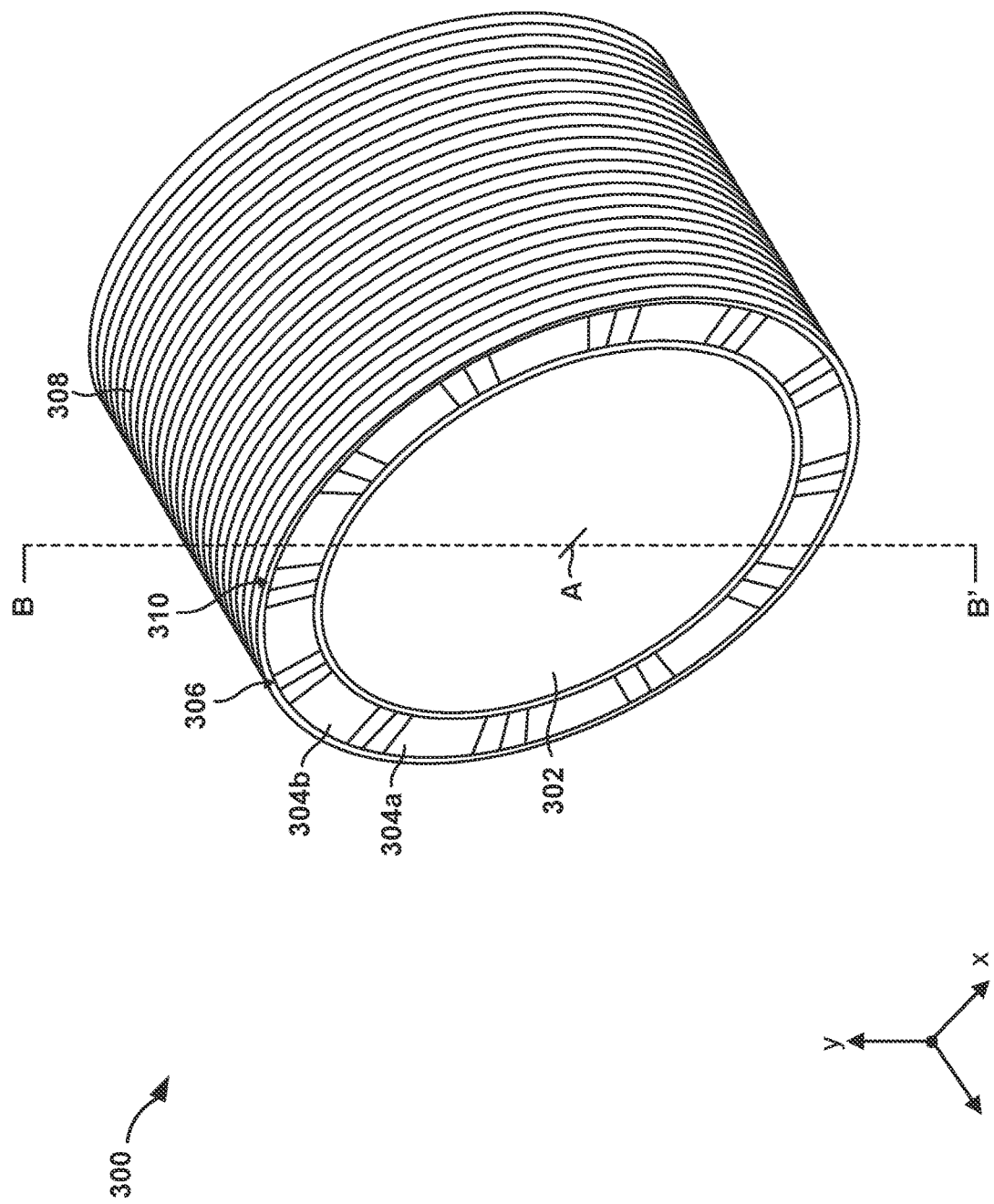
FIG. 4 is a perspective view of the assembled rotor assembly of FIG. 3, in accordance with one or more techniques of this disclosure.

FIGS. 3-4 are perspective views of a rotor assembly 300, in accordance with one or more techniques of this disclosure. FIG. 3 is an exploded perspective view of a rotor assembly 300, and FIG. 4 is a perspective view of the assembled rotor assembly 300.

In the example shown in FIG. 3, rotor assembly 300 includes rotor core 302, a plurality of magnet pairs 304a and 304b of opposite polarity and segmented in the axial direction and disposed on or about the surface of rotor core 302, metallic layer 306, plurality of segmented metallic bands 308, and (optionally) electrically insulating layer 310. The plurality of magnet pairs 304a and 304b may be collectively referred to as segmented magnets 304. In some examples, rotor core 302 may optionally have a coating and/or layer (not shown in FIGS. 3-4) disposed on its outer surface, and segmented magnets 304 may be disposed on the outer surface of such a coating and/or layer. In some examples, rotor core 302 may be an example of and may be the same as rotor core 212 described above. The plurality of segmented metallic bands 308 may be configured to secure segmented magnets 304 to the outer surface of rotor core 302 or the outer surface of a coating and/or layer on the outer surface of rotor core 302. Rotor assembly 300 may be an example of an assembled rotor assembly, e.g., after placing and positioning of segmented magnets 304, slip-fitting and heat shrinking metallic layer 306, and press-fitting plurality of metallic bands 308.

Metallic layer 306 may be substantially similar to metallic layer 216 of FIG. 2, e.g., metallic layer 306 may be configured to protect and reduce damage and/or mechanical wear to both segmented magnets 304 and plurality of segmented bands 308 and may be a thin, heat-shrinkable material that may be slip-fit over segmented magnets 304.

The plurality of metallic bands 308 may be substantially similar to plurality of metallic bands 218 of FIG. 2, e.g., the plurality of metallic bands 308 may be configured to secure segmented magnets 304 to the outer surface of rotor core 302 or the outer surface of a coating and/or layer on the outer surface of rotor core 302. In the example shown, the plurality of metallic bands 308 includes twenty-five metallic bands or "rings," segmented to have equal axial lengths, however, rotor assembly 300 may include more or fewer segmented metallic bands 308. For example, rotor assembly 300 may include as few as two segmented metallic bands 308 of unequal lengths that together secure all of segmented magnets 304 to the outer surface of rotor core 302 (or the outer surface of any coatings/layers on the outer surface of rotor core 302). Generally, each segment or band of the plurality of segmented metallic bands 308 has an axial length that is less than the axial length of rotor assembly 300, and each band of the plurality of segmented metallic bands may be of equal or unequal axial length. In some examples, the number of segmented metallic bands 308 may be from one band to N bands, where N is any positive number. Typically, N may be the total axial length of rotor assembly 300 divided by the axial length of each metallic band (for metallic bands of equal length), and the axial length of each metallic band may be determined based on the skin depth of a dominant magnetic field frequency in the air gap between rotor assembly 300 and a stator (e.g., which may be determined based on the power electronics and stator with which rotor assembly 300 may be used). For example, the axial length of each of the plurality of metallic bands 308 may be less than the skin depth of the dominant magnetic field frequency. In some examples, the total axial length of the plurality of metallic bands 308 may be less than the total length of one or more components of rotor assembly 300, e.g., segmented magnets 304. For example, a portion of one or both ends of segmented magnets 304 may extend beyond the axial extent of the plurality of metallic bands 308. As another example, there may be gaps between each of the plurality of metallic bands 308 such that the sum of the axial lengths of the plurality of metallic bands is less than the axial length of one or more components of rotor assembly 300, and in some examples a portion of one or both ends of one or more components of rotor assembly 300 may or may not extend beyond the end-metallic band (e.g., the first and/or last metallic band in the axial direction) of the plurality of metallic bands 308 at each axial end of rotor assembly 300. In some examples, the total axial length of the plurality of metallic bands 308 may be greater than the axial length of one or more of the other components of rotor assembly 300, e.g., segmented magnets 304, metallic layer 306, and (optionally) electrically insulating layer 310. For example, a portion of one or both end-metallic band (e.g., first and/or last metallic band in the axial direction) of the plurality of metallic bands 308 at one or both axial ends of rotor assembly 300 may axially extend beyond segmented magnets 304. In other examples, one or more metallic bands 308 may axially extend beyond one or more of the other components of rotor assembly 300. For example, at least some of the plurality of metallic bands 308 may be attached to each other, e.g., for support.

Each band of the plurality of segmented metallic bands may be configured to secure one or more of the segmented magnets 304 to rotor core 302, that is, each band is configured to have material properties such as thickness, stiffness/elasticity, brittleness, ductility/malleability, fracture toughness, hardness, fatigue strength, shear, tensile, and yield strengths, toughness, wear resistance, and the like to secure segmented magnets 304 during operation of the rotor assembly (e.g., rotation at high speeds) for a substantial amount of time, e.g., the useful life-time of rotor assembly 300 and/or an electric machine including rotor assembly 300.

Electrically insulating layer 310 may be disposed between metallic layer 306 and the plurality of segmented metallic bands 308, e.g., as a sacrificial layer to further smooth the outer surface profile of metallic layer 306 and to further reduce press-fit friction and mechanical resistance of the plurality of segmented metallic bands 308 to being press-fit. For example, the outer surface of the electrically insulating layer may have a reduced radial depth variation compared to the outer surface of the metallic layer. Electrically insulating layer 310 may be configured to increase heat transfer from inner layers (e.g., rotor core 302, segmented magnets 304, and metallic layer 306) to the outer segmented metallic bands 308, e.g., for heat removal via conduction to a cooling fluid such as air and/or cooling oils or other suitable liquids in contact with surfaces of the plurality of metallic bands 308. In other words, electrically insulating layer 310 may be a thermal conductor, and may be configured to increase thermal conduction between metallic layer 306 and the plurality of segmented metallic bands 308 compared to thermal conduction between metallic layer 306 and the plurality of segmented metallic bands 308 in direct contact with each other and thermal conduction between metallic layer 306 and the plurality of segmented metallic bands 308 with an air gap between the metallic layer 306 and the plurality of segmented metallic bands 308.

FIGS. 5 and 6 are cross-sectional diagrams of at least an axial portion of a rotor assembly 400, in accordance with one or more techniques of this disclosure. FIG. 5 is a cross-sectional diagram of at least an axial portion of rotor assembly 400 taken along the line B-B' as shown in FIG. 4, and FIG. 6 is a detailed view of a portion C of rotor assembly 400 illustrated in FIG. 5. Rotor assembly 400 may be an example of, and may be substantially similar to, rotor assemblies 204 and 300 of FIGS. 2-3, respectively. The example of rotor assembly 400 shown in FIGS. 5-6 may illustrate one example of the relative sizes of the segmenting of the magnets and metallic banding, e.g., the relative axial lengths of the magnets and metallic bands. However, the magnets and metallic bands may have other axial lengths in other examples, and in general may have any axial length, e.g., that is less than the axial length of the entire rotor assembly 400. In the example shown, the relative radial thicknesses of the components may not be shown to scale or may not represent the radial thicknesses of the components of rotor assembly 400 relative to each other, e.g., in some examples, the metallic banding may be substantially radially thicker than metallic layer 406.

In the examples shown, rotor assembly 400 includes rotor core 402, magnet segments 404A-404J and magnet segments 414A-414J, collectively referred to as segmented magnets 404 and 414, respectively, metallic layer 406, electrically insulating layer 410, and a plurality of segmented metallic bands 408A-408C, collectively referred to as segmented metallic bands 408. In the example shown, rotor assembly 400 also includes rotor core coating/layer 420 disposed on the outer surface of rotor core 402. In some examples, rotor core coating/layer 420 may be a protective layer for rotor core 402 or may be an adhesive layer for at least partially holding and/or placing segmented magnets 404 and 414 on rotor core 402, or both. In some examples, rotor core 302 may be an example of and may be the same as rotor core 212 described above.

In the examples shown, each of segmented magnets 404A-404J may be of the same polarity. For example, segmented magnets 404A-404J may correspond to a plurality of segmented magnets of the same polarity located at a circumferential position along the axial length of the rotor core, e.g., an axial "row" of segmented magnets 304b as illustrated in FIG. 3. Segmented magnets 414A-414J may correspond to a plurality of segmented magnets of the same polarity located at a different circumferential position and along the length of rotor core 402. In the examples shown in FIGS. 4 and 5, segmented magnets 404 and 414 are of the same polarity, but in other examples segmented magnets 404 may be a different polarity from segmented magnets 414. For example, the circumferential position between segmented magnets 404 and 414 differs by 180 degrees, e.g., they are on opposite sides of rotor core 402 because in the examples shown, rotor assembly 400 is cylindrical and the cross-section is along the line B-B' which passes through longitudinal axis A of the cylindrical rotor assembly. Rotor assembly 400 may have axial "rows" of segmented magnets that have any suitable circumferential size and may have any number of axial "rows" of segmented magnets about its circumference. As such, in some examples, the segmented magnet axial "rows" on opposites sides of rotor assembly 400 may have the same polarity or may have the opposite polarity, depending on the circumferential size of each row, the size of any spacing between rows (e.g., zero spacing is illustrated in FIGS. 3-6), and the number rows about the circumference.

Metallic layer 406 may be substantially similar to metallic layers 216 and 306 of FIGS. 2 and 3-4, respectively, e.g., metallic layer 406 may be configured to protect and reduce damage and/or mechanical wear to both segmented magnets 404, 414 and plurality of segmented bands 408 and may be a thin, heat-shrinkable material that may be slip-fit over segmented magnets 404, 414.

Electrically insulating layer 410 may be between metallic layer 406 and the plurality of segmented metallic bands 408 and may be substantially similar to electrically insulating layer 310 of FIGS. 304, e.g., electrically insulating layer 310 may be a sacrificial layer to further smooth the outer surface profile of metallic layer 406 and to further reduce press-fit friction and mechanical resistance of the plurality of segmented metallic bands 408 to being press-fit. Electrically insulating layer 410 may be configured to increase heat transfer from inner layers (e.g., rotor core 402, segmented magnets 404, and metallic layer 406) to the outer segmented metallic bands 408, e.g., for heat removal via conduction to a cooling fluid such as air and/or cooling oils or other suitable liquids in contact with surfaces of the plurality of metallic bands 408. In other words, electrically insulating layer 410 may be a thermal conductor, and may be configured to increase thermal conduction between metallic layer 406 and the plurality of segmented metallic bands 408 compared to thermal conduction between metallic layer 406 and the plurality of segmented metallic bands 408 in direct contact with each other and thermal conduction between metallic layer 406 and the plurality of segmented metallic bands 408 with an air gap between the metallic layer 406 and the plurality of segmented metallic bands 408.

The plurality of metallic bands 408 may be substantially similar to plurality of metallic bands 218 and 308 of FIGS. 2 and 3-4, respectively, e.g., the plurality of metallic bands 408 may be configured to secure segmented magnets 404, 414 to the outer surface of rotor core 402 or the outer surface of rotor core coating/layer 420 on the outer surface of rotor core 402.

In the example shown in FIG. 6, the metallic bands 408 have a shorter axial length than segmented magnets 404, e.g., there are about 2.5 metallic bands for every segmented magnet in the axial direction in the example shown. In general, the axial length of both the segmented magnets 404, 414 and metallic bands 408 may be any length less than the axial length of one or more components of rotor assembly 400. In some examples, the axial length of each metallic band may be more than the axial length of each segmented magnet. In some examples, the length of any of individual segmented magnet 404, 414 and metallic band 408 may vary along the entire axial length and about the circumference of rotor assembly 400.

Figure 7:
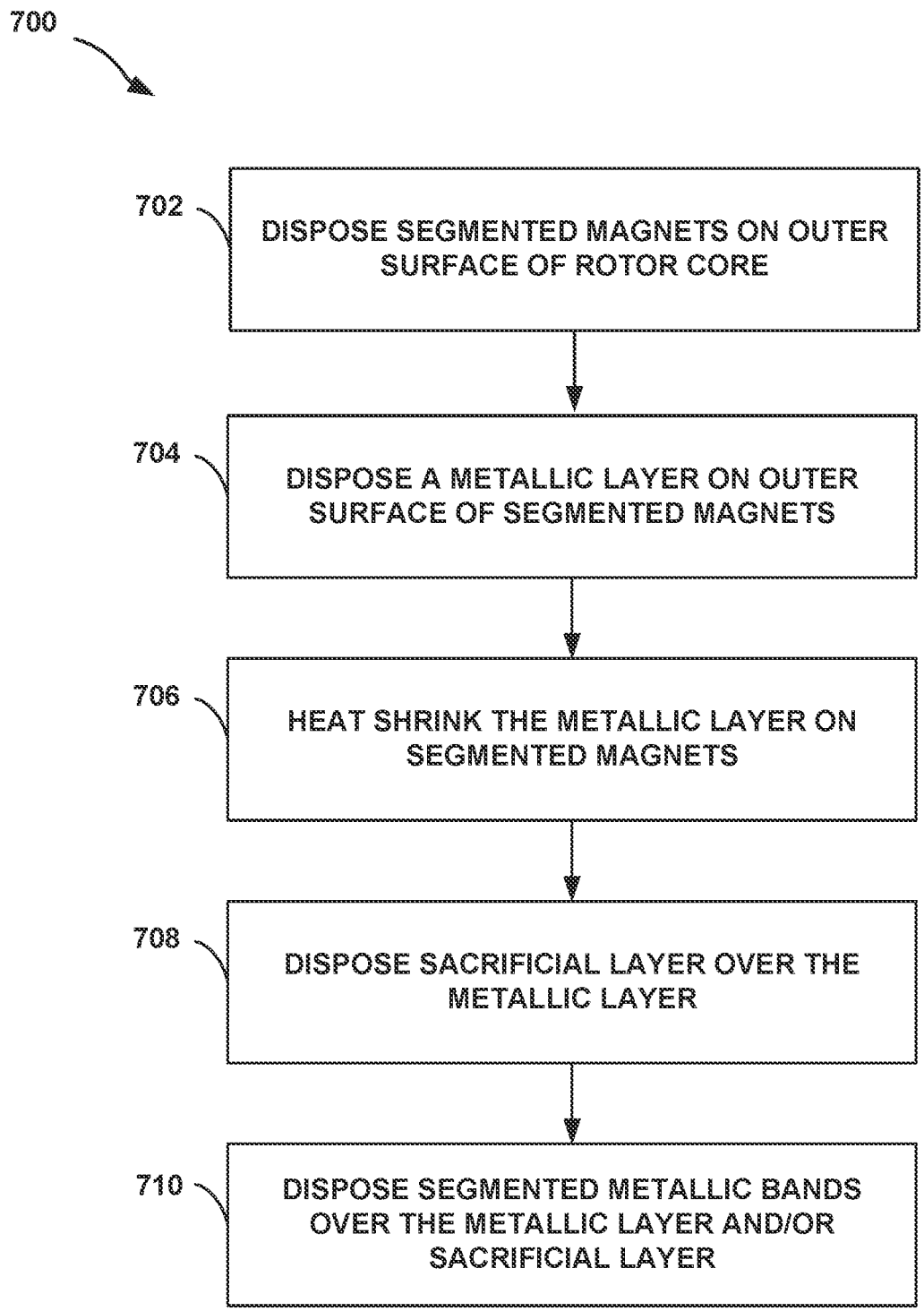
FIG. 7 is a flowchart of an example method of securing a plurality of segmented magnets to a rotor core, in accordance with one or more techniques of this disclosure.

FIG. 7 is a flowchart of an example method of securing a plurality of segmented magnets to a rotor core, in accordance with one or more techniques of this disclosure. Although described with reference to rotor assembly 300 and FIGS. 5-6, the method shown may be used with any suitable electric machine and/or rotor assembly, e.g., motor 104, generator 108, electric machines 200, and/or rotor assembly 300.

The technique of FIG. 7 may include disposing a plurality of segmented magnets on the outer surface of a rotor core (702). For example, a rotor assembly fabricator and/or assembler, e.g., a person and/or one or more assembly machines, may dispose segmented magnets, such as any of segmented magnets 304a, 304b, 404, or 414, on an outer surface of rotor core 402 and/or the outer surface of rotor core coating/layer 420. The segmented magnets, e.g., segmented magnets 404, 414, may be placed in "rows" in the axial direction, with alternating rows of segmented magnets having opposite polarity. In some examples, all of the segmented magnets 404, 414, may be the same, and oriented relative to each other such that they have their poles oriented in the same direction or in opposite directions. For example, all of the segmented magnets 404, 414, may be of the same size and be neodymium-iron-boron (NdFeB) rare-earth magnets, samarium cobalt (SmCo) magnets, aluminum-nickel-cobalt (Alnico) magnets, or ceramic or ferrite magnets, and may be positioned on rotor core 402 with an orientation that determines each magnet's "polarity." In other examples, all or some of the segmented magnets 404, 414 may be different sizes and be made of differing types and materials, e.g., NdFeB, SmCo, Alnico, or ceramic or ferrite, and may be positioned on rotor core 402 with an orientation that determines each magnet's "polarity." In some examples, rotor core 402 may first be coated and/or layered with rotor core coating/layer 420, e.g., a protective and/or adhesive coating and/or layer for at least partially holding and/or placing segmented magnets 404, 414 on rotor core 402.

The technique also may include disposing a metallic layer on the outer surface of the segmented magnets (704). For example, metallic layer 406 may be slip-fit over all or at least a portion of segmented magnets 404, 414. Metallic layer 406 may be a hollow cylindrical shell, may be relatively thin, e.g., having a radial thickness of less than one millimeter and/or a radial thickness that is less than the electrical skin depth of a dominant magnetic field frequency in the air gap between the rotor assembly and a stator, and metallic layer 406 may be heat-shrinkable.

In some examples, the technique of FIG. 7 may optionally include heat-shrinking the metallic layer on the segmented magnets (706). For example, metallic layer 406, once disposed in place over segmented magnets 404, 414, may be heat-shrunk onto segmented magnets 404, 414 and may be mechanically held to segmented magnets 404, 414 by compression from heat shrinking. Metallic layer 406 may cover over any gaps and grooves of segmented magnets, thereby reducing the radial depth variation of the outer surface of segmented magnets 404, 414. The resulting smoothed surface provided by metallic layer 406 may reduce friction and resistance of segmented metallic bands 408 during press-fitting and may protect both segmented magnets 404, 414 and segmented metallic bands 408 from chipping and/or other surface damage, e.g., by providing a barrier layer between segmented magnets 404, 414 and segmented metallic bands 408.

The technique also may optionally include disposing a sacrificial layer over the metallic layer (708). For example, a layer of an electrically insulating material, e.g., electrically insulating layer 410, may be disposed over metallic layer 406 and may further reduce press-fit friction and mechanical resistance of segmented metallic bands 408 to being press-fit over metallic layer 406. Electrically insulating layer 410 may additionally increase heat transfer from inner layers (e.g., rotor core 402, segmented magnets 404, 414, and metallic layer 406) to the outer segmented metallic bands 408 (when assembled), e.g., for heat removal via a cooling fluid such as air and/or cooling oils or other suitable liquids. In some examples, the electrically insulating material may be made of fiberglass, a polymer, a monomer, a composite polymer or monomer, and/or a polyimide film such as Kapton™ sleeve. In some examples, the electrically insulating material may be made of an aramid or meta-aramid material, such as a Nomex™ sleeve.

Finally, the technique of FIG. 7 may include disposing a plurality of segmented metallic bands over the sacrificial layer (or the metallic layer if the sacrificial layer is not present) (710). In some examples, the sacrificial layer is optional, e.g., the rotor assembly 400 may not include electrically insulating material 410 and method 700 may not include method step 706, and the rotor assembly fabricator may dispose the plurality of segmented metallic bands over the metallic layer (710).

For example, segmented metallic bands 408 may be press-fit onto and/or over (e.g., circumferentially surrounding) metallic layer 406 (or optionally over electrically insulating layer 410). In some examples, the metallic layer 406 may decouple mechanical constraints of press-fitting segmented metallic bands 408 directly over segmented magnets 404, 414 by smoothing/reducing/eliminating gaps and grooves between segmented magnets 404, 414 and by providing a barrier layer/material between segmented magnets 404, 414 and segmented metallic banding 408. The metallic layer 406 may also reduce friction and/or mechanical resistance of segmented metallic banding 408 during press-fitting and may protecting both segmented magnets 404, 414 and segmented metallic banding 408 from damage during press-fitting, (e.g., damage such as chipping, scraping, scratching, bending, etc., of surfaces and edges of the magnets and the segmented metallic bands), and also from damage and/or mechanical wear during operation of rotor assembly 400. Electrically insulating layer 410, if optionally used, may further reduce the friction and/or mechanical resistance of segmented metallic bands 408 during press-fitting and may further protect segmented magnets 404, 414, segmented metallic bands 408, and metallic layer 406 from damage.

The following examples may illustrate one or more aspects of the disclosure:

Example 1. A rotor assembly comprising: a plurality of segmented magnets on an outer surface of a rotor core; a metallic layer on the outer surface of the plurality of segmented magnets; and a plurality of segmented metallic bands on the outer surface of the metallic layer and configured to secure the plurality of segmented magnets to the outer surface of the rotor core, wherein each band of the plurality of metallic bands has an axial length less than an axial length of the rotor.

Example 2. The rotor assembly of example 1, wherein the metallic layer has a radial thickness of less than one millimeter.

Example 3. The rotor assembly of any one of examples 1 or 2, wherein the metallic layer has a radial thickness that is less than an electrical skin depth of a dominant magnetic field frequency in the air gap between the rotor assembly and a stator.

Example 4. The rotor assembly of any one of examples 1-3, wherein the metallic layer comprises an alloy, a superalloy, a nickel-chromium-based superalloy, titanium, or stainless steel.

Example 5. The rotor assembly of any one of examples 1-4, wherein the metallic layer is slip fit over the plurality of segmented magnets and heat shrunk onto the plurality of segmented magnets after being slip-fit into position.

Example 6. The rotor assembly of any one of examples 1-5, wherein an outer surface of the metallic layer has a reduced radial depth variation compared to the outer surface of the plurality of segmented magnets.

Example 7. The rotor assembly of any one of examples 1-6, wherein the metallic layer is configured to reduce mechanical wear on the plurality of segmented magnets from the plurality of segmented metallic bands.

Example 8. The rotor assembly of any one of examples 1-7, further comprising: an electrically insulating layer disposed between the metallic layer and the plurality of segmented metallic bands.

Example 9. The rotor assembly of example 8, wherein an outer surface of the electrically insulating layer has a reduced radial thickness variation compared to the outer surface of the metallic layer.

Example 10. The rotor assembly of any one of examples 8 or 9, wherein the electrically insulating layer is configured to reduce a mechanical resistance of the plurality of segmented metallic bands to being press-fit onto the outer surface of the metallic layer.

Example 11. The rotor assembly of any one of examples 8-10, wherein the electrically insulating layer is at least one of fiberglass, a polymer, a monomer, a composite polymer or monomer, a polyimide, and an aramid or meta-aramid.

Example 12. The rotor assembly of any one of examples 8-11, wherein the electrically insulating layer is a thermal conductor configured to increase thermal conduction between the metallic layer and the plurality of segmented metallic bands compared to thermal conduction between the metallic layer and the plurality of segmented metallic bands in direct contact with each other and thermal conduction between the metallic layer and the plurality of segmented metallic bands with an air gap between the metallic layer and the plurality of segmented metallic bands 408.

Example 13. A method of securing a plurality of segmented magnets to a rotor core, the method comprising: disposing a plurality of segmented magnets on the outer surface of the rotor core; disposing a metallic layer on the outer surface of the plurality of segmented permanent magnets; and disposing a plurality of segmented metallic bands on the surface of the metallic layer, wherein the plurality of segmented metallic bands are configured to secure the plurality of segmented magnets to the outer surface of the rotor core, and wherein each band of the plurality of metallic bands has an axial length less than an axial length of the rotor.

Example 14. The method of example 13, wherein the metallic layer comprises an alloy, a superalloy, a nickel-chromium-based superalloy, titanium, or stainless steel.

Example 15. The method of any one of examples 13 or 14, further comprising heat shrinking the metallic layer onto the outer surface of the plurality of segmented magnets prior to disposing the plurality of segmented metallic bands on the surface of the metallic layer.

Example 16. The method of any one of examples 13-15, wherein disposing the plurality of segmented metallic bands on the surface of the metallic layer comprises press-fitting the plurality of segmented metallic bands on the surface of the metallic layer.

Example 17. The method of any one of examples 13-16, wherein the metallic layer has a radial thickness that is less than an electrical skin depth of a dominant magnetic field frequency in the air gap between the rotor and a stator.

Example 18. The method of any one of examples 13-17, further comprising: disposing an electrically insulating layer on the outer surface of the metallic layer, wherein the electrically insulating layer is configured to reduce a resistance of the plurality of segmented metallic bands to being press-fit onto the outer surface of the metallic layer.

Example 19. An electric machine comprising: a rotor assembly, the rotor assembly comprising: a plurality of segmented magnets disposed on the outer surface of a rotor core;
a metallic layer disposed on the outer surface of the plurality of segmented magnets; and a plurality of segmented metallic bands disposed on the outer surface of the first metallic layer and configured to secure the plurality of segmented magnets to the outer surface of the rotor core, and wherein each band of the plurality of metallic bands has an axial length less than an axial length of the rotor.

Example 20. The electric machine of example 19 further comprising: a stator, wherein the rotor assembly is configured to rotate relative to the stator.

Various examples have been described. These and other examples are within the scope of the following claims.

What is claimed is:

1. A rotor assembly comprising:
   a plurality of segmented magnets on an outer surface of a rotor core;
   a metallic layer on the outer surface of the plurality of segmented magnets;
   a plurality of segmented metallic bands on the outer surface of the metallic layer and configured to secure the plurality of segmented magnets to the outer surface of the rotor core, wherein each band of the plurality of metallic bands has an axial length less than an axial length of the rotor assembly; and
   an electrically insulating layer disposed between the metallic layer and the plurality of segmented metallic bands.

2. The rotor assembly of claim 1, wherein the metallic layer has a radial thickness of less than one millimeter.

3. The rotor assembly of claim 1, wherein the metallic layer comprises an alloy, a superalloy, a nickel-chromium-based superalloy, titanium, or stainless steel.

4. The rotor assembly of claim 1, wherein the metallic layer is slip fit over the plurality of segmented magnets and heat shrunk onto the plurality of segmented magnets after being slip-fit into position.

5. The rotor assembly of claim 1, wherein an outer surface of the metallic layer has a reduced radial depth variation compared to the outer surface of the plurality of segmented magnets.

6. The rotor assembly of claim 1, wherein the metallic layer is configured to reduce mechanical wear on the plurality of segmented magnets from the plurality of segmented metallic bands.

7. The rotor assembly of claim 1, wherein an outer surface of the electrically insulating layer has a reduced radial thickness variation compared to the outer surface of the metallic layer.

8. The rotor assembly of claim 1, wherein the electrically insulating layer is configured to reduce a mechanical resistance of the plurality of segmented metallic bands to being press-fit onto the outer surface of the metallic layer.

9. The rotor assembly of claim 1, wherein the electrically insulating layer is at least one of fiberglass, a polymer, a monomer, a composite polymer or monomer, a polyimide, and an aramid or meta-aramid.

10. The rotor assembly of claim 1, wherein the electrically insulating layer is a thermal conductor configured to increase thermal conduction between the metallic layer and the plurality of segmented metallic bands compared to thermal conduction between the metallic layer and the plurality of segmented metallic bands in direct contact with each other and thermal conduction between the metallic layer and the plurality of segmented metallic bands with an air gap between the metallic layer and the plurality of segmented metallic bands 408.

11. A method of securing a plurality of segmented magnets to a rotor core of a rotor, the method comprising:
   disposing a plurality of segmented magnets on the outer surface of the rotor core;
   disposing a metallic layer on the outer surface of the plurality of segmented permanent magnets;
   disposing a plurality of segmented metallic bands on the surface of the metallic layer, wherein the plurality of segmented metallic bands are configured to secure the plurality of segmented magnets to the outer surface of the rotor core, and wherein each band of the plurality of metallic bands has an axial length less than an axial length of the rotor; and
   heat shrinking the metallic layer onto the outer surface of the plurality of segmented magnets prior to disposing the plurality of segmented metallic bands on the surface of the metallic layer.

12. The method of claim 11, wherein the metallic layer comprises an alloy, a superalloy, a nickel-chromium-based superalloy, titanium, or stainless steel.

13. The method of claim 11, wherein disposing the plurality of segmented metallic bands on the surface of the metallic layer comprises press-fitting the plurality of segmented metallic bands on the surface of the metallic layer.

14. The method of claim 11, further comprising:
   disposing an electrically insulating layer on the outer surface of the metallic layer, wherein the electrically insulating layer is configured to reduce a resistance of the plurality of segmented metallic bands to being press-fit onto the outer surface of the metallic layer.

15. An electric machine comprising:
   a rotor assembly, the rotor assembly comprising:
      a plurality of segmented magnets disposed on the outer surface of a rotor core of a rotor;
      a metallic layer disposed on the outer surface of the plurality of segmented magnets; and
      a plurality of segmented metallic bands disposed on the outer surface of the first metallic layer and configured to secure the plurality of segmented magnets to the outer surface of the rotor core, and wherein each band of the plurality of metallic bands has an axial length less than an axial length of the rotor,
   wherein an outer surface of the metallic layer has a reduced radial depth variation compared to the outer surface of the plurality of segmented magnets.

16. The electric machine of claim 15 further comprising:
   a stator, wherein the rotor assembly is configured to rotate relative to the stator.

* * * * *